(12) United States Patent
Shimazaki et al.

(10) Patent No.: US 7,093,590 B2
(45) Date of Patent: Aug. 22, 2006

(54) DIESEL ENGINE

(75) Inventors: Naoki Shimazaki, Fujisawa (JP); Terukazu Nishimura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/092,080

(22) Filed: Mar. 29, 2005

(65) Prior Publication Data

US 2005/0217649 A1 Oct. 6, 2005

(30) Foreign Application Priority Data

Mar. 31, 2004 (JP) .............................. 2004-103050

(51) Int. Cl.
*F02M 25/07* (2006.01)
*F01L 1/34* (2006.01)

(52) U.S. Cl. .............................. 123/568.14; 123/568.21

(58) Field of Classification Search ............ 123/90.11, 123/90.15, 90.16, 90.17, 90.18, 295, 299, 123/305, 568.11, 568.14, 568.2, 568.21; 701/103, 108
See application file for complete search history.

(56) References Cited

U.S. PATENT DOCUMENTS

| | | | | |
|---|---|---|---|---|
| 4,142,491 A | * | 3/1979 | Hibino et al. ............. | 123/568.2 |
| 4,181,110 A | * | 1/1980 | Kohama et al. ............ | 123/676 |
| 6,024,069 A | * | 2/2000 | Yoshino ..................... | 123/295 |
| 6,125,801 A | * | 10/2000 | Mendler ................. | 123/568.14 |
| 6,354,264 B1 | * | 3/2002 | Iwakiri et al. .............. | 123/305 |
| 6,792,924 B1 | * | 9/2004 | Aoyama et al. ........ | 123/568.14 |

FOREIGN PATENT DOCUMENTS

| | | |
|---|---|---|
| JP | 10-331690 | 12/1998 |
| JP | 11-324764 | 11/1999 |

* cited by examiner

*Primary Examiner*—Willis R. Wolfe, Jr.
(74) *Attorney, Agent, or Firm*—McCormick, Paulding & Huber LLP

(57) ABSTRACT

A diesel engine includes a fuel injection device (9), an external EGR device (19), an internal EGR device (29), and a control device (26) for controlling the fuel injection device (9), external EGR device (19), and internal EGR device (29), wherein the control device (26) implements in a prescribed operation region a premixed combustion in which the fuel is injected before the vicinity of the top dead center and the EGR of a comparatively large quantity is implemented, and implements outside the prescribed operation region a normal combustion in which the fuel is injected in the vicinity of the top dead center and the EGR of a small quantity is implemented. The control device (26) controls the EGR ratio by using both the external EGR device (19) and the internal EGR device (29) when the premixed combustion is implemented and controls the EGR ratio by using only the external EGR device (19) when the normal combustion is implemented.

9 Claims, 3 Drawing Sheets

DIESEL ENGINE

CROSS REFERENCE TO RELATED APPLICATION

The applicants hereby claim foreign priority benefits under U.S.C. § 119 of Japanese Patent Application No. 2004-103050 filed on Mar. 31, 2004, and the content of which is herein incorporated by reference.

BACKGROUND OF THE INVENTION

1. Field of the Invention

The present invention relates to a diesel engine in which the premixed combustion and normal combustion are switched based on the engine operation state.

2. Description of the Related Art

In diesel engines, fuel is typically injected close to a compression top dead center of the piston when the temperature and pressure inside the cylinder are high. In this case, the fuel is ignited producing a flame during fuel injection, and the combustion is maintained by supplying subsequently injected fuel into this flame. In such conventional combustion mode, there is a portion of the initially injected fuel that is combusted after the ignition delay period and the portion combusted in the combustion gas with and insufficient amount of oxygen, thereby raising a problem of NOx and smoke generation. In the present specification, the combustion mode in which the fuel ignites during the injection is called "normal combustion".

Accordingly, the applicants have suggested a diesel engine in which the fuel injection timing was before the compression top dead center and the mixture was ignited after the end of fuel injection (Japanese Patent Application Laid-open No. 2003-83119).

In such a diesel engine, the mixture is ignited once a certain period elapses after the end of fuel injection. As a result, the mixture is sufficiently leaned and homogenized before the ignition. Therefore, local combustion temperature decreases and the amount of released NOx (nitrogen oxide) is decreased. Furthermore, the emission of smoke is also inhibited because local combustion in an air-deficient state is avoided. In the present specification, the combustion mode in which the mixture is ignited after the end of fuel injection will be called "premixed combustion" and the period from the end of fuel injection to the mixture ignition will be called "premixing period".

The premixed combustion is effective for improving the exhaust gas, but if the premixing period is insufficient, the effect of improving the exhaust gas cannot be obtained or fuel consumption is sometimes degraded. For example, if the premixing period is too short, leaning and homogenization of the mixture are insufficient and the effect of exhaust gas improvement is decreased. Furthermore, if the premixing period is too short and the ignition timing of the mixture is before the top dead center, the fuel consumption is degraded because the compression created by the piston is received after the ignition.

The applicants repeated various trial and error to resolve the above-described problem. The results obtained demonstrated that a sufficient premixing period can be ensured by implementing the EGR (exhaust gas recirculation) of a comparatively large quantity (EGR ratio of the mixture is increased) in combination with early injection of the fuel. In other words, if the EGR ratio is increased, the concentration of oxygen in the mixture decreases. Therefore, the premixing period can be extended. This technology was not publicly known at the time the present application was filed and does not constitute the prior art. In the present specification, the premixed combustion accompanied by the EGR of a comparatively large quantity is called "PCI (Premixed Compression Ignition) combustion"

However, the PCI combustion is difficult to realize in a high-load region of the engine. The reasons therefor are explained below.

(1) In the high-load region of the engine, the fuel injection quantity increases. Therefore, a large quantity of oxygen (air) is necessary to ensure the adequate air/fuel ration. Thus, the EGR of even larger quantity has to be conducted to ensure a sufficient premixing period in the state in which the quantity of fuel and oxygen increases. In other words, a large quantity of air (new air) and a large quantity of EGR gas (exhaust gas) have to be introduced into the combustion chamber. However, an intake system (supercharge system) capable of realizing such a process has not yet been developed.

(2) In the normal combustion, the fuel that is being injected burns by small portions (portion after portion). By contrast, in the PCI combustion, the entire injected fuel burns after it is mixed. Therefore, the maximum pressure in the cylinder is higher than that of the normal combustion. In a high-load region where the fuel injection quantity increases, the maximum pressure inside the cylinder further increases. Therefore, there is a possibility of the engine strength being insufficient.

Accordingly, the applicants suggested to switch the PCI combustion and normal combustion according to the engine operation state (in particular, engine load). In other words, the PCI combustion is implemented in the region with a comparatively low engine load, and the normal combustion is implemented in the region with a comparatively high engine load.

Here, there is a comparatively large difference in the required (adequate) EGR ratio between the PCI combustion and normal combustion. This difference can be explained as follows. In the PCI combustion, as described above, the premixing period is extended by the EGR of a large quantity and the exhaust gas is improved. However, in the normal combustion, if the large-quantity EGR is implemented, then a local oxygen insufficiency occurs and smoke is generated. Therefore, the EGR ratio has to be suppressed to a certain low level.

Therefore, when the engine operation state moves from the PCI combustion implementation region to the normal combustion implementation region or in the opposite direction, the EGR has to be changed rather significantly.

However, because the EGR gas and intake air are compressible, the EGR ratio of the mixture is difficult to change rapidly. In particular, in the external EGR apparatus, which returns part of the exhaust gas present in the exhaust channel into the intake channel, the delay of the changes in the EGR ratio becomes more significant due to the response delay of the EGR valve and the existence of the volume portion associated with the distance (intake path) from the EGR valve to the combustion chamber.

By contrast, the fuel injection timing can be controlled with a comparatively high accuracy by controlling the electric actuation timing of the injector. Therefore, switching between the PCI combustion and normal combustion can be conducted rapidly. As a result, a mismatch occurs between the fuel injection timing and EGR ratio immediately after switching between the PCI combustion and normal combustion. This can cause degradation of exhaust gas or fuel consumption.

SUMMARY OF THE INVENTION

It is an object of the present invention to control and change rapidly the EGR ratio when the premixed combustion and normal combustion are switched.

The diesel engine in accordance with the present invention that was designed to attain the above-described object comprises a fuel injection apparatus for injecting a fuel into a combustion chamber, an external EGR apparatus for returning part of the exhaust gas present in an exhaust channel into an intake channel via an EGR channel, an internal EGR apparatus for controlling the opening-closing timing of an intake valve or exhaust valve and returning part of the exhaust gas into the combustion chamber or retaining it therein, and a control apparatus for controlling the fuel injection apparatus, external EGR apparatus, and internal EGR apparatus. The control apparatus implements in a prescribed operation region a premixed combustion in which the fuel is injected before the compression top dead center of a piston, the EGR of a comparatively large quantity is implemented, and the mixture ignites after the end of fuel injection. The control apparatus implements outside the prescribed operation region a normal combustion in which the fuel is injected in the vicinity of the top dead center, the EGR is implemented in a quantity less than that when the premixed combustion is implemented, and the mixture ignites during this injection. Moreover, the control apparatus controls the EGR ratio by using both the external EGR apparatus and the internal EGR apparatus when the premixed combustion is implemented, and controls the EGR ratio by using only the external EGR apparatus, without implementing the EGR with the internal EGR apparatus, when the normal combustion is implemented.

The control apparatus may implement the premixed combustion in an operation region with a comparatively low load and may implement the normal combustion in a region with a load higher than that in the region where the premixed combustion is implemented.

Further, when implementing the premixed combustion, the control apparatus may control the external EGR apparatus so that the EGR ratio produced by the external EGR apparatus becomes substantially equal to the maximum EGR ratio attained when the normal combustion is implemented and may control the internal EGR apparatus so as to compensate the insufficiency in the EGR produced by the external EGR apparatus.

Further, the internal EGR apparatus may open the exhaust valve in the intake stroke.

Further, the internal EGR apparatus may shorten the opening period of the exhaust valve in the exhaust stroke with respect to the normal one.

Further, the internal EGR apparatus may open the intake valve in the exhaust stroke.

SUMMARY OF THE INVENTION

The preferred embodiment of the present invention will be described below in greater detail based on the appended drawings.

Figure 1:
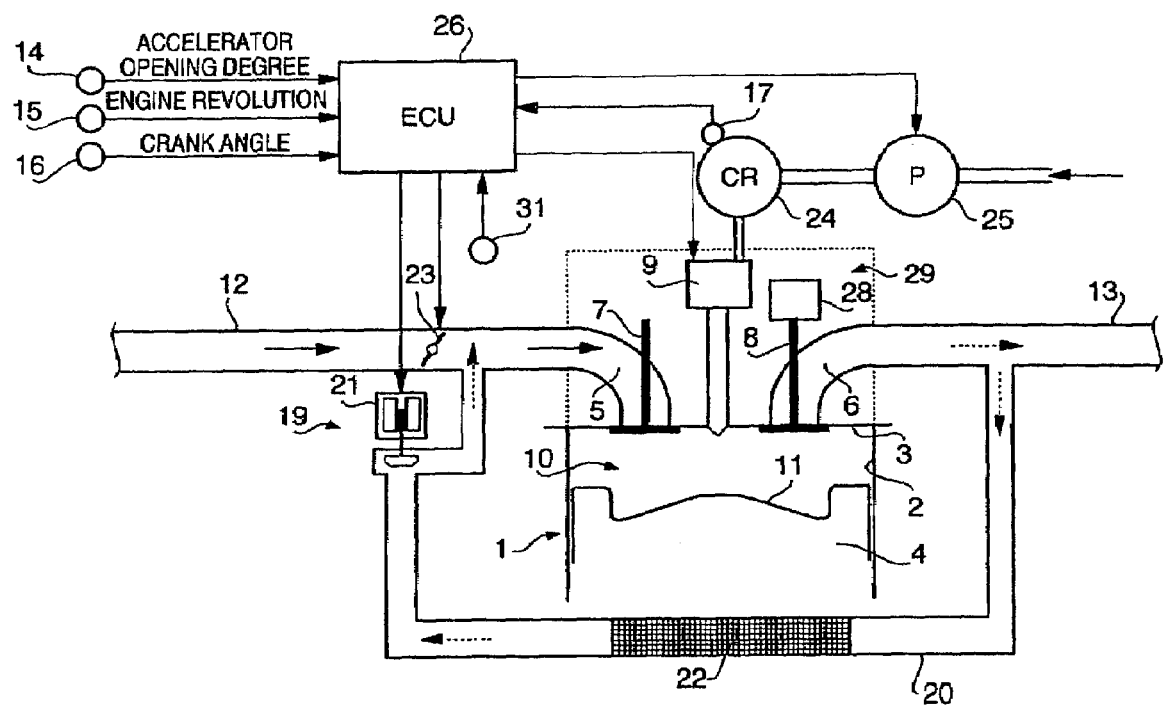
FIG. 1 is a schematic view of the diesel engine of an embodiment of the present invention.

FIG. 1 is a schematic drawing of a diesel engine (referred to hereinbelow simply as "engine") of the present embodiment. In FIG. 1, only one cylinder is shown, but obviously a configuration with multiple cylinders is possible.

In FIG. 1, the reference symbol 1 stands for an engine body. It is composed of a cylinder 2, a cylinder head 3, a piston, 4 an intake port 5, an exhaust port 6, an intake valve 7, an exhaust valve 8, and an injector 9. A cavity 11 is formed in the head portion of the piston 4, and a combustion chamber 10 is formed in the space surrounded by this cavity 11, cylinder 2, and cylinder head 3. Fuel is directly injected from the injector 9 into the combustion chamber 10. The cavity 11 of the present embodiment has a form of a toroidal combustion chamber with a protruding center of the bottom portion. However, the present invention places no limitation on the shape of he combustion chamber 10 and it may be a reentrant combustion chamber of the like.

The injector 9 is disposed coaxially with the cylinder 2, and fuel is injected radially at the same time from a plurality of holes. The injector 9 is connected to a common rail 24, and high-pressure fuel stored in the common rail 24 is constantly supplied to the injector 9. The fuel is pumped by a high-pressure supply pump 25 to the common rail 24.

The intake port 5 is connected to an intake pipe 12, and the exhaust port 6 is connected to an exhaust pipe 13.

The engine of the present embodiment further comprises an external EGR apparatus 19 for returning part of exhaust gas present in the exhaust pipe 13 (exhaust channel) into the intake pipe 12 (intake channel) and an internal EGR apparatus 29 for controlling the opening-closing timing of the exhaust valve and returning part of the exhaust gas into the combustion chamber 10.

The external EGR apparatus 19 comprises an EGR pipe 20 (EGR channel) for connecting the intake pipe 12 and exhaust pipe 13, a an EGR valve 21 for adjusting the EGR ratio by changing the cross-sectional surface area of the passage of the EGR pipe 20, and an EGR cooler 22 for cooling the EGR gas upstream of the EGR valve 21. The EGR ratio of the mixture can be increased by increasing the valve opening degree of the EGR valve 21. Conversely, the EGR ratio of the mixture can be decreased by decreasing the valve opening degree of the EGR valve 21. An intake throttle valve 23 for appropriately throttling the intake air upstream of the connection zone with the EGR pipe 20 is provided in the intake pipe 12.

The internal EGR apparatus 29 comprises a variable valve mechanism 28 equipped with an electromagnetic solenoid for driving (opening and closing) the exhaust valve 8. The variable valve mechanism 28 opens temporarily the exhaust valve 8 in the engine intake stroke when the EGR is implemented. As a result, part of the exhaust gas located inside the exhaust port 6 and exhaust pipe 13 is returned into the combustion chamber 10. Extending the opening period of the exhaust valve 8 in the intake stroke makes it possible to increase the EGR ratio of the mixture. Conversely, the EGR ration can be decreased by shortening this timing.

An ECU (control unit) 26 for electronically controlling the engine is also provided. The ECU 26 reads the operation state of the engine from a variety of sensors and controls the injector 9, EGR valve 21, variable valve mechanism 28, and intake throttle valve 23 based on the engine operation state. An accelerator opening sensor 14 for detecting the accelerator opening degree (equivalent to engine load), an engine revolution sensor 15 for detecting the revolutions speed of the engine, a crank angle sensor 16 for detecting the angle of the crank shaft (not shown in the figure) of the engine, and a common rail pressure sensor 17 for detecting the fuel pressure in the common rail 24 are the examples of the aforementioned sensors, and the detection values of those sensors are inputted in the ECU 26.

Further, the ECU 26 of the present embodiment switches between the PCI combustion and normal combustion based on the engine operation state.

Thus, in the region with a comparatively low engine load, the PCI combustion (premixed combustion) is implemented in which the mixture is ignited after the end of fuel injection by setting the fuel injection timing earlier (for example, at about 40°–20° BTDC) before the compression top dead center of the piston and implementing the EGR of a comparatively large quantity, and in the region with a comparatively high engine load (outside the region where the PCI combustion is implemented), a normal combustion is implemented in which the fuel is ignited during injection thereof by implementing a pilot injection of a comparatively small quantity of fuel before the compression top dead center and a main injection of a comparatively large amount of fuel in the vicinity of the compression top dead center and by implementing the EGR of a comparatively small quantity when the aforementioned PCI combustion is implemented.

A map having set therein the target values (optimum values) of fuel injection quantity, fuel injection timing of each engine operation state, and EGR ratio (or the control amounts relating to the external EGR apparatus 19 and internal EGR apparatus 29) for each engine operation state is inputted in advance into the ECU 26. The ECU 26 determines the target values of the fuel injection quantity, fuel injection timing, EGR ratio, and the like from the map based on the detection values of the accelerator opening degree sensor 14, engine revolution sensor 15, and the like, and controls the injector 9, external EGR apparatus 19, and internal EGR apparatus 29 according to those target values. In the operation region in which the PCI is implemented, the target fuel injection timing is set before the compression top dead center of the piston and the target EGR ratio is set at a comparatively high level. In the operation region in which the normal combustion is implemented, the target fuel injection timing of the pilot injection is set before the compression top dead center, the target fuel injection timing is set close to the compression top dead center of the main injection, and the target EGR ratio is set at a comparatively low level. In other words, switching between the PCI combustion and normal combustion is automatically conducted according to the engine operation state by controlling the injector 9, external EGR apparatus 19, and internal EGR apparatus 29 according to the map.

As described hereinabove, there is a comparatively large difference in the target EGR ratios (optimum EGR ratios) between the PCI combustion and normal combustion. This difference will be explained using FIG. 2.

Figure 2:
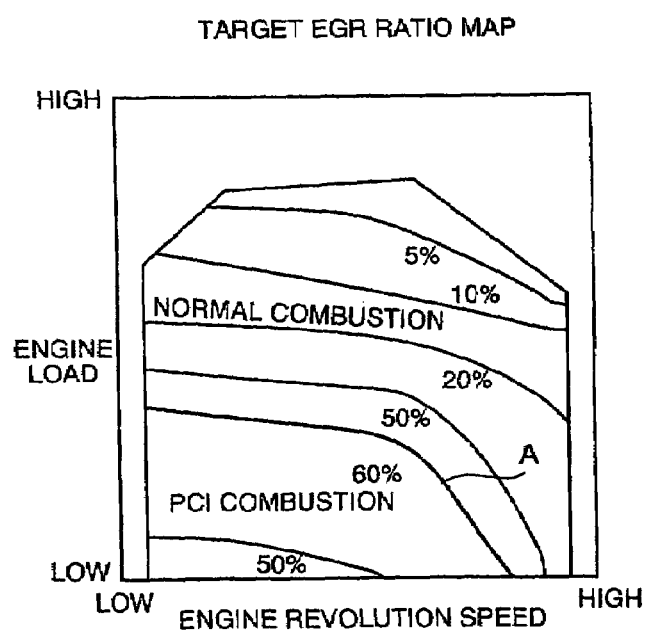
FIG. 2 is a map having sent therein the target EGR ratios for each engine operation mode.

FIG. 2 shows a map in which the target EGR ratio is set for each engine operation state. The line A in the figure is a switching line of the PCI combustion and normal combustion. Thus, in the region in which the engine operation state is below the line A (region with a low engine load), the PCI combustion is implemented, and in the region above the line A, the normal combustion is implemented.

As follows from the figure, in the region where the PCI combustion is implemented, the target EGR ratio is set at a comparative high level (50–60% in the example shown in the figure). This is done to ensure a sufficient premixing period by implementing the EGR of a large quantity and to obtain good combustion gas and fuel consumption. In the region where the PCI combustion is implemented, the set level of the target EGR ratio increases with the increase in the engine load. Therefore, the target EGR ratio assumes a maximum value (here, 60%) in the vicinity of the switching line A with the normal combustion.

On the other hand, in the region where the normal combustion is implemented, the target EGR ratio is set lower than that in the region where the PCI is implemented (5–30% in the example shown in the figure). This is done to prevent the generation of smoke caused by insufficient amount of oxygen. In the region where the normal combustion is implemented, the set level of the target EGR ratio increases with the increase in the engine load. Therefore, the target EGR ratio assumes a maximum value (here, 30%) in the vicinity of the switching line A with the PCI combustion. In the present embodiment, the maximum target EGR ratio (30%) during normal combustion is set lower than the minimum target EGR ratio (50%) during PCI combustion.

Thus, there is a comparatively large difference between the target EGR ratio in the region where the PCI combustion is implemented and the region where the normal combustion is implemented. Therefore, the target EGR ratio differs rather significantly on both sides of the switching line A. In the example shown in FIG. 2, the difference in the target EGR ratios on both sides of the switching line A is 30%. Therefore, when the engine operation state changes so as to cross the line A and the PCI combustion and normal combustion are switched, it is necessary to decrease or increase the EGR ratio of the mixture by 30% within a short time.

In the diesel engine of the present embodiment, measures have been taken to change rapidly the EGR ratio when the PCI combustion and normal combustion are switched.

Figure 4A:
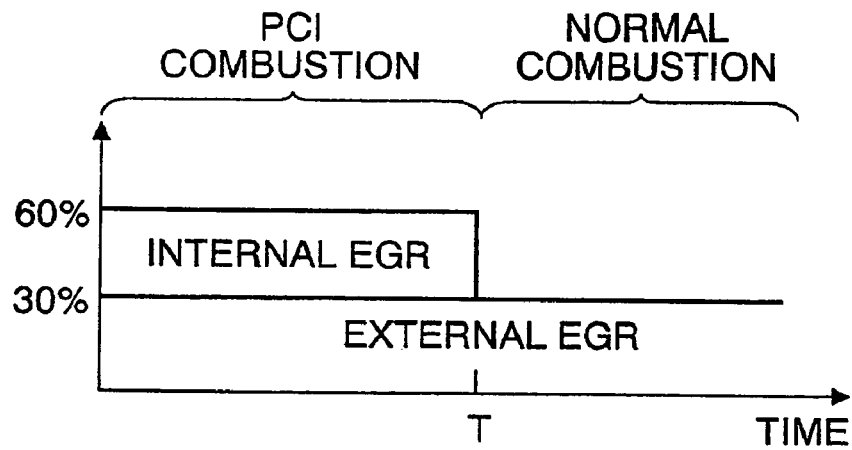
FIG. 4a shows changes in the EGR ratio occurring during switching from the PCI combustion to the normal combustion in the diesel engine of one embodiment of he present invention.

More specifically, the ECU 26, as shown in FIG. 4a, controls the EGR ratio of the mixture to the target EGR ratio by operating both the external EGR apparatus 19 and the internal EGR apparatus 29 described hereinabove when the PCI combustion is implemented, and controls the EGR ratio of the mixture to the target EGR ratio by operating only the external EGR apparatus 29, without implementing the EGR by the internal EGR apparatus 29, when the normal combustion is implemented. In other words, when switching is performed between the PCI combustion and normal combustion, the EGR ratio can be greatly and rapidly changed by switching between the operative and non-operative state of the internal EGR apparatus 29.

Figure 3A:
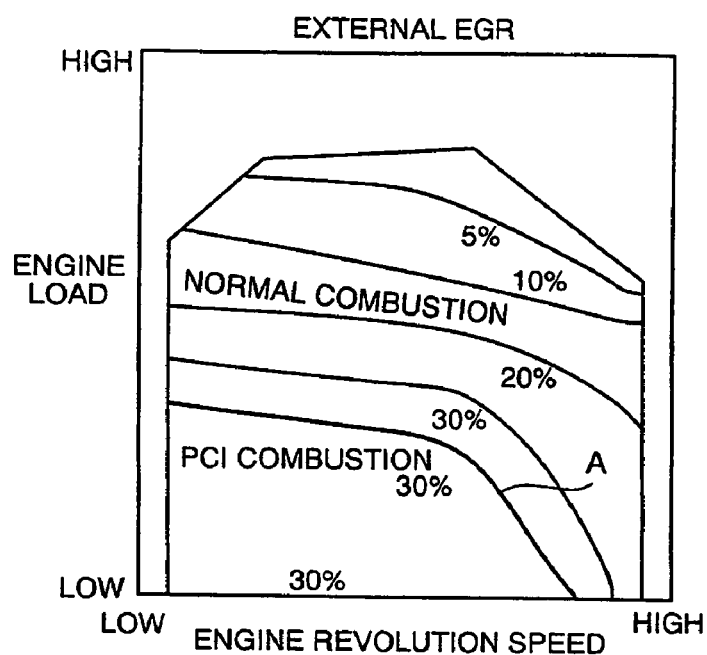
FIG. 3a is a map where the target EGR ratios of the external EGR apparatus are set.
Figure 3B:
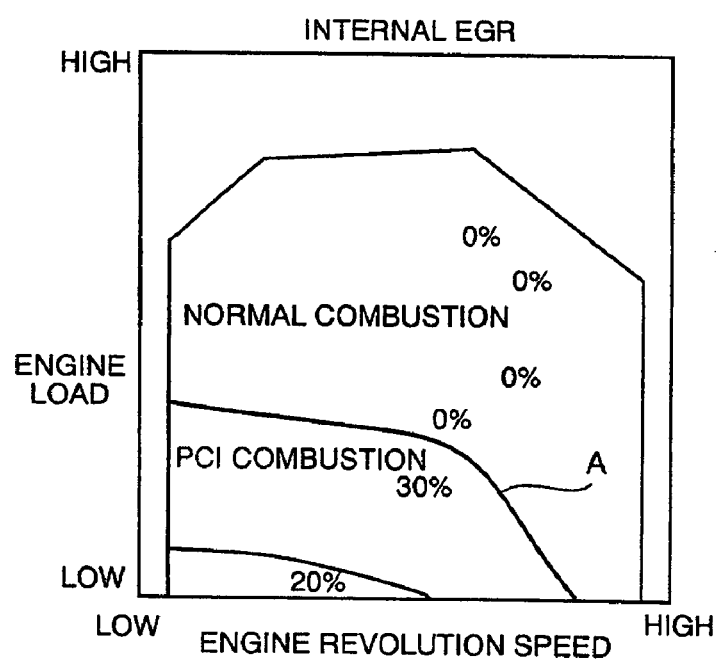
FIG. 3b is a map where the target EGR ratios of the internal EGR apparatus are set.

The maps having set therein the target EGR ratios of the external EGR apparatus 19 and internal EGR apparatus 29 are shown in FIG. 3a and FIG. 3b, respectively. FIG. 3a is a map having set therein the target EGR ratios of the external EGR apparatus 19, and FIG. 3b is a map having set therein the target EGR ratios of the internal EGR apparatus 29. Adding up the target EGR ratios set in those two maps yields a result equal to the target EGR ratios shown in the map of FIG. 2.

As shown in the figure, in the region where the normal combustion is implemented, the target EGR ratio of the external EGR apparatus 19 is set equal to the target EGR ratio shown in FIG. 2, and the target EGR ratio of the internal EGR apparatus 29 is set to 0%. This is because, as described hereinabove, in the region where the normal combustion is implemented, the EGR ratio is controlled by using only the external EGR apparatus 19.

On the other hand, in the region where the PCI combustion is implemented, the target EGR ratio of the external EGR apparatus 19 is set to be constant, regardless of the engine operation state. This target EGR ratio is set to be equal to the maximum target EGR ratio (target EGR ratio in the vicinity of the switching line A, here, it is 30%) in the region where the normal combustion is implemented. Further, the target EGR ratio of the internal EGR apparatus 29 is set as an EGR ratio (here, it is 20–30%) equal to the difference between the EGR ratio that is necessary in the PCI combustion (target EGR ratio shown in FIG. 2) and the target EGR ratio of the external EGR apparatus 19, that is, to the portion which is insufficient in the EGR conducted with the external EGR apparatus 19.

Figure 4B:
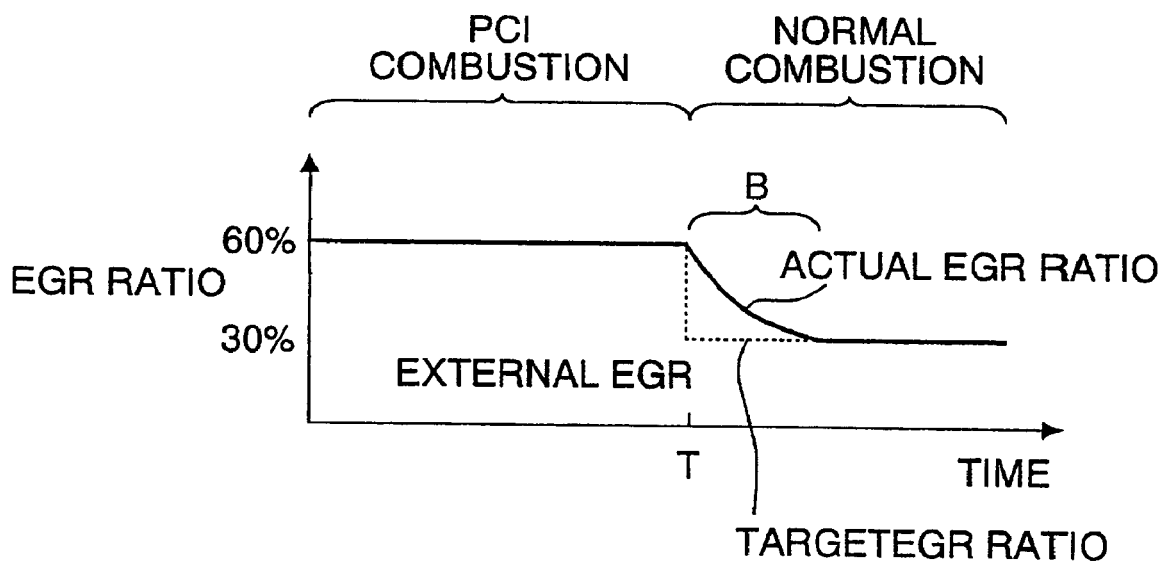
FIG. 4b shows changes in the EGR ratio occurring during switching from the PCI combustion to the normal combustion in the engine in which the EGR ratio is controlled by using only the eternal EGR apparatus.

Actual changes in the EGR ratio of the mixture in the combustion chamber during switching from the PCI combustion to the normal combustion in the engine of this embodiment will be explained below by using FIG. 4a. FIG. 4b shows for comparison the changes in the EGR ratio of the engine using only the external EGR apparatus 19 for controlling the EGR ratio of the mixture.

In the figure, time is plotted against the abscissa, and the point in time T corresponds to switching of the engine operation state from the region where the PCI combustion is implemented to the region where the normal combustion is implemented.

Before the point in time T, that is, when the PCI combustion is implemented, the EGR ratio of the mixture is controlled to a comparatively high level (60% in the figure).

At this time, as shown in FIG. 4a, in the engine of the present embodiment, the maximum EGR ratio fraction (30%) in the normal combustion is attained by the external EGR apparatus 19, and the remaining fraction (30%) is attained by the internal EGR apparatus 29. By contrast, in the engine shown in FIG. 4b, the entire EGR ratio (60%) is attained by the external EGR apparatus 19.

When the point in time T is reached and the engine operation state is switched from the PCI combustion implementation region to the normal combustion implementation region, the target EGR ratio decreases greatly (here, 60%→30%).

At this time, in the engine of the present embodiment, as shown in FIG. 4a, the EGR by the internal EGR apparatus 29 is stopped completely (30%→0%). This is attained by substantially zeroing the opening period of the exhaust valve 8 in the intake stroke and, therefore, can be made within 1 cycle. Thus, the exhaust gas does not return to the combustion chamber 10 unless the exhaust valve is opened in the intake stroke. Therefore, 0% can be obtained reliably and rapidly, without a delay in time. On the other hand, the EGR ratio produced by the external EGR apparatus 19 is equal to the target EGR ratio (maximum target EGR ratio in normal combustion) immediately after switching to the normal combustion. Therefore, the control quantity relating to the external EGR apparatus 19 is maintained at the same level. With the above-described control, the actual EGR ratio of the mixture decreases rapidly at the point in time T and coincides with the target EGR ratio (30%).

By contrast, in the engine shown in FIG. 4b, the EGR ratio is reduced by adjusting the control quantity (valve opening degree of the EGR valve) relating to the external EGR apparatus 19 when the PCI combustion was switched to the normal combustion at the point in time T. In this case, due to the presence of an intake path from the EGR valve 21 to the combustion chamber 10 and because of a response delay of the EGR valve, the EGR ratio changes slowly as shown in the figure. As a result, a difference between the target EGR ratio and the actual EGR ratio appears in the region B shown in the figure. Thus, a mismatch can occur between the fuel injection timing and the EGR ratio in this region B and the exhaust gas or fuel consumption can be degraded.

In the engine of the present embodiment, the EGR ratio can be changed rapidly when the PCI combustion is switched to the normal combustion. Therefore, the mismatch between the fuel injection timing and EGR ratio is prevented and neither the exhaust gas nor the fuel consumption is degraded.

Further, contrary to the example shown in FIG. 4a, when the engine operation state is switched from the normal combustion implementation region to the PCI combustion implementation region, the EGR ratio control conducted only with the external EGR apparatus 19 is switched to the EGR ratio control conducted by both the external EGR apparatus 19 and the internal EGR apparatus 29. In this case, too, the rise (0→30%) of the EGR ratio created by the internal EGR apparatus 29 is attained within 1 cycle. Therefore, the EGR ratio can be changed (increased) rapidly.

The EGR ratio apparently can be changed rather rapidly by constantly controlling the EGR ratio of the mixture by using only the internal EGR apparatus 29 in both the PCI combustion and normal combustion mode. However, a demerit of the internal EGR is that the exhaust gas at a high temperature that did not pass through the cooler returns to the combustion chamber 10, thereby creating a risk of raising the mixture temperature and degrading the exhaust gas. For this reason, it is undesirable to control the EGR ratio by using only the internal EGR apparatus 29.

In the engine of the present embodiment, the EGR ratio can be changed rapidly, while reducing this demerit of the internal EGR to a minimum, by using both the external EGR apparatus 19 and the internal EGR apparatus 29.

The present invention is not limited to the above-described embodiment.

For example, FIG. 2 and FIG. 3 shows a map having the target values of EGR ratio set therein, but the present invention is not limited to such an implementation, and an implementation in which a map having the control parameters (valve opening degree of the EGR valve 21 of the external EGR apparatus 19, release period of the exhaust valve 8 controlled by the variable valve mechanism 28 of the internal EGR apparatus 29, and the like) of the EGR apparatus corresponding to the target EGR value is created and the ECU 26 controls the external EGR apparatus 19 and internal EGR apparatus 29 is also possible.

Further, the variable valve mechanism 28 is not limited to the mechanism equipped with an electromagnetic solenoid for adjusting the opening-closing timing of the exhaust vale 8, and the mechanism may be used of the type in which a plurality of cams for opening and closing the exhaust valve 2 are provided and the cam to be used is selected among them.

Further, the internal EGR apparatus 29 is not limited to the type in which the exhaust vale 8 is opened in the intake stroke, and internal EGR apparatuses of a variety of types can be employed, for example, an apparatus in which the opening period of the exhaust valve 8 in the exhaust stroke is shortened with respect to the usual period (when no internal EGR is implemented) and part of the exhaust gas is retained in the combustion chamber, or the apparatus in which the intake valve 7 is temporarily opened in the exhaust stroke, part of the exhaust gas is retained in the intake port 5 and intake pipe 12, and this exhaust gas is returned together with the intake air to the combustion chamber 10 in the intake stroke.

Further, in the above-described embodiment, the case was explained where a pilot injection and main injection are conducted when the normal combustion is implemented. However, the present invention is not limited to such an implementation. For example, only the main injection may be conducted and an after injection for combusting the unburned fuel may be implemented after the main injection.

With the above-described diesel engine in accordance with the present invention, the EGR ratio can be rapidly controlled when the premixed combustion and normal combustion are switched.

What is claimed is:

1. A diesel engine comprising:
    a fuel injection apparatus for injecting a fuel into a combustion chamber;
    an external EGR (exhaust gas recirculation) apparatus for returning part of exhaust gas present in an exhaust channel into an intake channel via an EGR channel;
    an internal EGR apparatus for controlling opening-closing timing of an intake valve or exhaust valve and returning part of the exhaust gas into the combustion chamber or retaining it therein; and
    a control apparatus for controlling the fuel injection apparatus, the external EGR apparatus, and the internal EGR apparatus; wherein
    the control apparatus implements in a prescribed operation region a premixed combustion in which the fuel is injected before the compression top dead center of a piston, the EGR of a comparatively large quantity is implemented, and the mixture ignites after the end of fuel injection, and implements outside the prescribed operation region a normal combustion in which the fuel is injected in the vicinity of the top dead center, the EGR is implemented in a quantity less than that when the premixed combustion is implemented, and the fuel ignites during this injection; and
    the control apparatus controls the EGR ratio by using both the external EGR apparatus and the internal EGR apparatus when the premixed combustion is implemented, and controls the EGR ratio by using only the external EGR apparatus, without implementing the EGR with the internal EGR apparatus, when the normal combustion is implemented.

2. The diesel engine according to claim 1, wherein
    the control apparatus implements the premixed combustion in an operation region with a comparatively low load and implements the normal combustion in a region with a load higher than that in the region where the premixed combustion is implemented.

3. The diesel engine according to claim 1, wherein
    the internal EGR apparatus opens the exhaust valve in the intake stroke.

4. The diesel engine according to claim 1, wherein
    the internal EGR apparatus shortens the opening period of the exhaust valve in the exhaust stroke with respect to when no internal EGR is implemented.

5. The diesel engine according to claim 1, wherein
    the internal EGR apparatus opens the intake valve in the exhaust stroke.

6. The diesel engine according to claim 1, wherein
    when implementing the premixed combustion, the control apparatus controls the external EGR apparatus so that the EGR ratio produced by the external EGR apparatus becomes substantially equal to the maximum EGR ratio attained when the normal combustion is implemented and controls the internal EGR apparatus so as to compensate the insufficiency in the EGR produced by the external EGR apparatus.

7. The diesel engine according to claim 6, wherein
    the internal EGR apparatus opens the exhaust valve in the intake stroke.

8. The diesel engine according to claim 6, wherein
    the internal EGR apparatus shortens the opening period of the exhaust valve in the exhaust stroke with respect to when no internal EGR is implemented.

9. The diesel engine according to claim 6, wherein
    the internal EGR apparatus opens the intake valve in the exhaust stroke.

* * * * *

UNITED STATES PATENT AND TRADEMARK OFFICE
CERTIFICATE OF CORRECTION

PATENT NO. : 7,093,590 B2  Page 1 of 1
APPLICATION NO. : 11/092080
DATED : August 22, 2006
INVENTOR(S) : Shimazaki et al.

It is certified that error appears in the above-identified patent and that said Letters Patent is hereby corrected as shown below:

Column 1, line 26, after "with" delete "and".
Column 1, line 27, before the word "insufficient" please insert -- an --.
Column 1, lines 49-50, please delete "the effect of improving".
Column 1, line 50, after "gas" please insert -- benefit --.
Column 1, line 53, before "exhaust" please delete "effect of".
Column 1, line 54, please delete "improvement" and insert -- benefit--.
Column 1, line 59, after "error" please insert -- experiments--.
Column 2, line 2, after "constitute" please delete "the".
Column 2, line 5, after "combustion"" please insert -- . --.
Column 2, line 11, please delete "the" and insert -- an --.
Column 2, line 11 delete "ration" and insert -- ratio --.
Column 2, line 12, after "of" insert -- an --.
Column 4, line 3, please delete "he" and insert --the --.
Column 4, line 30, please delete "he" and insert -- the--.
Column 4, line 49, after "13," please delete "a".
Column 8, line 34, please delete "demerit" and insert -- deficiency --.
Column 8, line 34 after "that" please insert -- at a high temperature --.
Column 8, lines 34-35, please delete "at a high temperature".
Column 8, line 41, please delete "reducing" and insert -- keeping --.
Column 8, line 41, please delete "demerit" and insert -- deficiency --.
Column 8, line 46, please delete "shows" and insert -- show --.
Column 8, line 48, please delete ", and an" and insert -- . An --.
Column 8, line 66, please delete ", and internal" and insert --. Internal --.
Column 8, line 67, please delete ", for" and insert --. For --.
Column 8, line 67, after "apparatus" insert -- may be employed --.
Column 9, line 4, after "or" delete "the" and insert -- an --.

Signed and Sealed this

Thirtieth Day of January, 2007

JON W. DUDAS
*Director of the United States Patent and Trademark Office*